(12) United States Patent
Brown et al.

(10) Patent No.: US 6,578,710 B1
(45) Date of Patent: Jun. 17, 2003

(54) PUMPKIN DECORATING KIT AND METHOD USING LIGHT GUIDING PEGS

(75) Inventors: Barry Brown, Denver, CO (US); Michael Hennessey, Denver, CO (US)

(73) Assignee: Pumpkin Ltd., Denver, CO (US)

( * ) Notice: Subject to any disclaimer, the term of this patent is extended or adjusted under 35 U.S.C. 154(b) by 0 days.

(21) Appl. No.: 09/889,338

(22) PCT Filed: Oct. 20, 2000

(86) PCT No.: PCT/US00/41420

§ 371 (c)(1),
(2), (4) Date: Jul. 16, 2001

(87) PCT Pub. No.: WO01/43990

PCT Pub. Date: Jun. 21, 2001

Related U.S. Application Data

(60) Provisional application No. 60/160,849, filed on Oct. 21, 1999.

(51) Int. Cl.[7] ............................................. B65D 73/00
(52) U.S. Cl. .................................... 206/457; 206/575
(58) Field of Search ................................ 206/457, 575; 33/566; 264/155, 156; 362/190, 191, 208, 234, 252, 808

(56) References Cited

U.S. PATENT DOCUMENTS

| 4,203,150 A | 5/1980 | Shamlian |
| D292,323 S | 10/1987 | Vandrilla |
| D299,556 S | 1/1989 | Marshbanks |
| 4,828,114 A | 5/1989 | Bardeen |
| 4,839,784 A | 6/1989 | Lin |
| 4,866,580 A | 9/1989 | Blackerby |
| 4,955,807 A | 9/1990 | Chance et al. |
| 5,091,833 A | 2/1992 | Paniaguas et al. |
| 5,152,602 A | 10/1992 | Boschetto |
| 5,174,645 A | 12/1992 | Chung |
| 5,327,332 A | 7/1994 | Hafemeister |
| 5,597,230 A * | 1/1997 | Newman ..................... 362/154 |
| 5,918,964 A * | 7/1999 | Bou ............................ 362/122 |
| 6,055,738 A * | 5/2000 | Bardeen et al. ............. 206/575 |
| D427,708 S | 7/2000 | Bardeen et al. |
| 6,093,446 A * | 7/2000 | Bardeen ...................... 156/240 |
| 6,309,092 B1 * | 10/2001 | Bardeen et al. ............. 362/202 |
| 6,342,175 B1 * | 1/2002 | Brown et al. ................ 264/155 |

\* cited by examiner

*Primary Examiner*—Shian Luong
(74) *Attorney, Agent, or Firm*—Timothy J. Martin; Michael R. Henson; Rebecca A. Gegick (57) ABSTRACT

A children's kit for illuminative decoration of the exterior shell of a pumpkin, without requiring a carving knife. The kit 10 consists of packaging 12, light pegs 60, a pattern sheet 30, a tool 100, and light 25. The light pegs 60 are a light transmissive material that can be colored and have a length at least equal to the pumpkin shell thickness. Each light peg 60 has a first end that is convergent to pierce the exterior shell wall and is operative to collect light, a shaft portion to transmit light to a second end with an enlarged peg head. The enlarged peg head protrudes above the shell surface and is operative to disperse light. The pattern 30 locates the light pegs 60 on the pumpkin shell, with the tool 100 used to drive the light pegs 60 through the pumpkin shell. The light 25 is placed inside the open interior of the pumpkin to illuminate the light pegs 60.

12 Claims, 7 Drawing Sheets

PUMPKIN DECORATING KIT AND METHOD USING LIGHT GUIDING PEGS

RELATED APPLICATIONS

This application claims the benefit of International Application No. PCT/US00/41420 filed on Oct. 20, 2000, which was published under PCT Article 21(2) in English on Jun. 21, 2001 as International Publication No. WO 01/43990 A2, which International Application claims the benefit of U.S. Provisional Application No. 60/160,849, filed Oct. 21,1999.

FIELD OF THE INVENTION

The present invention generally relates to a method and kit for illuminative decoration of an exterior surface portion of a shell wall formed from a large item of produce. More particularly, the present invention is directed to a method and kit using light guiding pegs for creating a pattern on a surface to be decorated. Specifically, the present invention is directed to a method and kit for decorating surfaces of large vegetables or produce having a selected shell wall thickness and an open interior, such as pumpkins, with holiday themes.

BACKGROUND OF THE INVENTION

The provision of decorative designs on exposed surfaces has been known since the earliest cavemen first scratched or painted animal sketches on the walls of their dwellings. As is well known, a variety of techniques are available for decorating surfaces, including printing, painting, carving, stenciling, etc. The present invention, however, is directed to forming patterns on a surface in a new and useful manner that may be particularly implemented by children. Even more specifically, the present invention concerns decorating items of produce, such as pumpkins, in order to provide a decorative holiday theme. Of particular concern is providing a method and a kit for decorating pumpkins for Halloween.

As is known, pumpkin carving has long been one of the several ways in which Halloween is celebrated. Traditionally, pumpkin carving involves the removal of a portion of the pumpkin shell surrounding the stem, removal of the seeds and fibers contained in the pumpkin and thereafter carving humorous, grotesque or other decorative features partially or whollythrough the pumpkin shell by removing fleshy portions of the shell to obtain the desired appearance. Internal illumination is then provided either by a candle or a battery operated light to result in a glowing decorative pattern.

In the past, pumpkin carving was typically accomplished with the use of pocketknives, paring knives, and the like. Due to the size of these cutting instruments, a typical carver was only able to obtain limited, fairly large-scaled decorative features. These knives can be quite difficult to control, and this, in conjunction with the sharpness of the knife, exposes the carver to the danger of injury. The result is that pumpkin carving exhibits a fairly high degree of danger for young children so that pumpkin carving was often done by an adult parent or older sibling. This, of course, reduces the enjoyment to the younger child from the pumpkin carving festivity.

In order to meet the need for safer instruments that might be utilized to carve decorative appearances in pumpkin shells, a pumpkin carving kit was developed and was described in U.S. Pat. No. 4,828,114 issued May 9, 1989 to John P. Bardeen. This pumpkin carving kit allows more intricate designs to be carved in the pumpkin shell and increases the safety over normal, pre-existing carving techniques for children, adults and the like. While this pumpkin carving kit exhibited a superior solution in response to the desire to carve pumpkins, there remained a need for safe pumpkin decorating techniques available to even younger children or as an alternative to pumpkin carving.

Other techniques have been known in the past to decorate pumpkins, and a primary example is the placing of decorative stickers on the pumpkin shell. Here, for example, decorative elements such as eyes, ears, noses, mouths and teeth are configured out of brightly colored paper-like material that is provided with an adhesive backing. The user simply selects the desired features and sticks each feature at a desired location on the pumpkin shell. While this provides enjoyment for a small child and is safe, it fairly limits the festive event since very little time is involved in applying the stickers to the pumpkin shell. Additionally, the resulting pumpkin creation does not entertain the prospect of being interiorly lit in the manner in which carved Halloween pumpkins generally are presented.

Accordingly, there remains a need for improved surface decorating techniques that may be specially employed by children and which provide a satisfying creation as an end result. These techniques need to be safe and easy to implement while providing increased enjoyment for the decorating experience. Moreover, there remains a need for an improved method and kit, especially usable by children that may be employed in the decorating of pumpkins for Halloween.

SUMMARY OF THE INVENTION

It is an object of the present invention to provide a new and useful pumpkin decorating kit that is especially constructed for use by very young children, such as those of an age of six (6) or younger.

It is another object of the present invention to provide a pumpkin decorating method that is easy to employ and which may be accomplished by a young child with a minimum of adult supervision.

It is a further object of the present invention to provide a simplified pumpkin decorating kit that eliminates the need for carving and which provides a brightly illuminated appearance.

Yet another object of the present invention is to provide a pumpkin decorating kit and method that employs techniques that are familiar to children. According to the present invention a kit for the illuminative decoration of an exterior surface of an item of produce is provided. Broadly, the kit includes a plurality of light pegs constructed of a light transmissive material and having a length at least equal to the thickness of the shell wall of the item of produce. The kit also includes a tool adapted to drive the light pegs through the exterior surface of the shell wall so that a portion will be able to optically communicate the open interior of the item of produce. The driving tool according to the present invention is preferably in the form of a mallet having an enlarged cylindrical head and a handle. In any event, the driving tool should be sized and configured to be grasped by a child of six years old or less.

The kit can also include one or more pattern sheets and an illumination device with the components of the kit being contained within suitable packaging. The pattern sheet is adapted to attach to the exterior surface portion of the shell wall and is marked to locate positions for at least some of the light pegs corresponding to a decorative pattern. In any event, each pattern sheet locates position for at least some of the light pegs by using elements selected from a group consisting of pattern holes, pattern dots and lines. The illumination device is preferably an electrically illumination device such as one that is battery operated. The battery powered light may have a flashing bulb to give a desired flashing effect. Moreover, the illumination device may have a base that is operative to penetrate into the shell wall to independently support the illumination device in the open interior of the item of produce.

Preferably, the light pegs are formed of a transparent plastic and come in at least three different colors. Accordingly, the pattern sheet may have markings that are correlated to the light peg's colors instructing the positioning of selected colors at selected locations. Each of the light pegs has a first or light collecting end that operates to collect the light, a shaft portion operative to transmit the light to a second end that is opposite the first end. The second end preferably is formed as an enlarge peg head operative to emit transmitted light divergently therefrom. The enlarged head may be provided with facets, grooves, ribs or images in order to enhance the aesthetic effect of the light emitted therefrom. The light collecting end preferably has a convergent end portion. The shaft may be coated with a light reflective material if desired. Alternatively, the shaft can have longitudinal grooves.

The present invention is also directed to a method for the illuminative decoration of the exterior of a large item of produce by the elements of the kit described above. Broadly, the method includes a first step of providing a plurality of light pegs that are constructive of light transmissive material and that include a light collecting portion, a light emitting portion and a shaft having a length extending from the light collecting portion to the light emitting portion. Next, the method includes the step of cutting an access port into the shell wall into the item of produce to expose the interior cavity. Then, matter in the interior cavity of the item of produce is removed to form an open interior cavity. The method then includes the step of scrapping the shell wall from the open interior cavity of the produce to reduce the thickness of the shell to a dimension about equal to or less the length of the shaft of the light pegs. At least some of the light pegs are then inserted into the exterior surface of the shell wall to a depth of at least the shell wall thickness. Finally, the method includes the step of illuminating the open interior of the cavity of the item of produce.

According to the method, the step of inserting the plurality of light pegs into the interior surface of the shell wall is accomplished by driving the light pegs through the shell with a tool. The method may also include the step of providing a pattern on the exterior surface of the item of produce and inserting the light pegs according to the pattern to produce a desired decoration. The method may also include the step of employing a plurality of light pegs to create a common design feature. Finally, the step of illuminating the open interior cavity is accomplished preferably by placing an electrically powered light source in the interior cavity.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention is generally directed to a pumpkin decorating kit, but the present invention particularly concerns a pumpkin decorating kit that may be used by very small children, such as those of an age of six (6) or less.

Accordingly, the present invention contemplates a method for decorating a pumpkin that is easy and that may be used with less adult supervision than that normally accompanying pumpkin sculpting or carving. The present invention also discloses a novel light peg that is central to the kit and method of the present invention.

Figure 1:
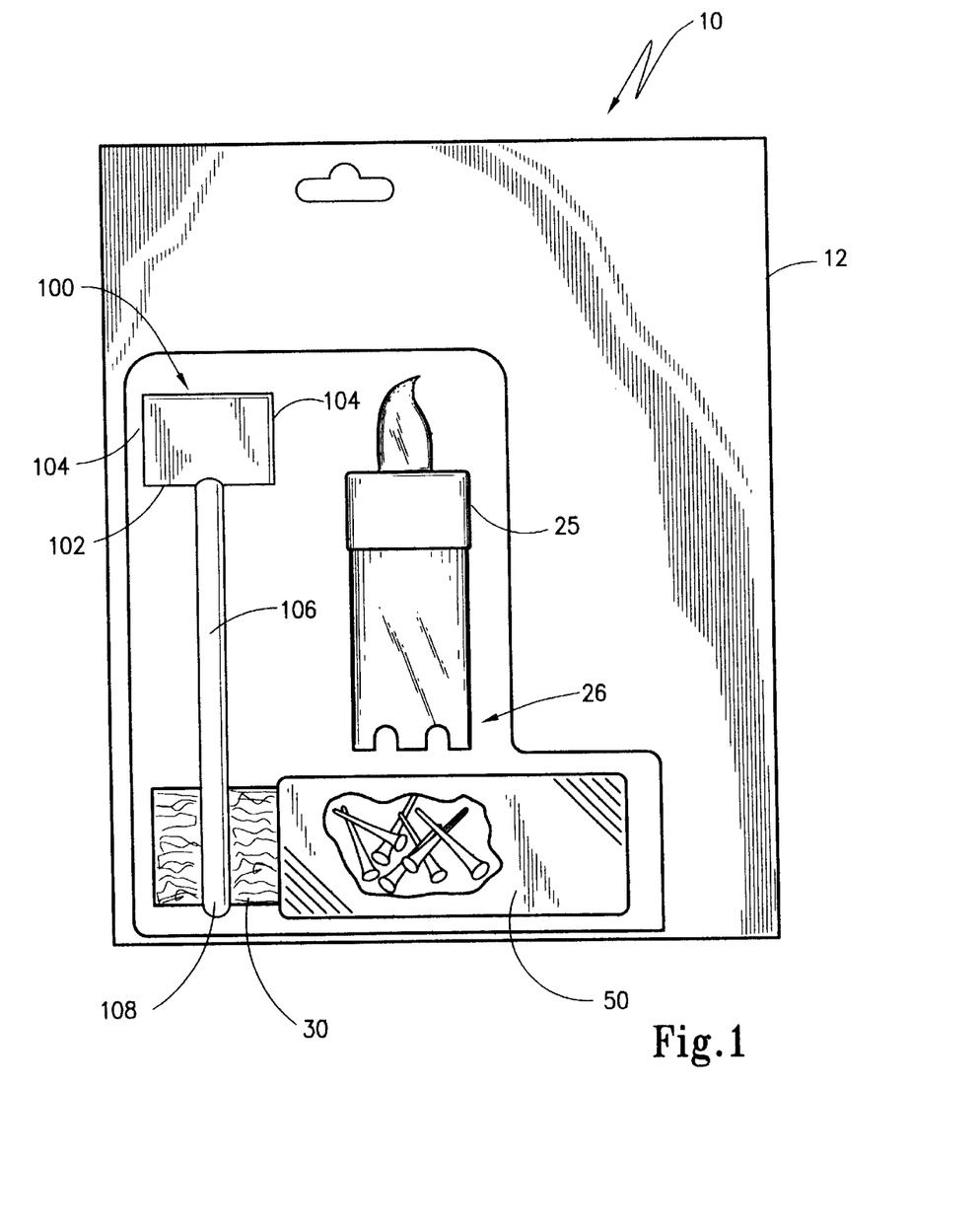
FIG. 1 is a front view in elevation showing a pumpkin decorating kit according to the exemplary embodiment of the present invention.
Figure 3:
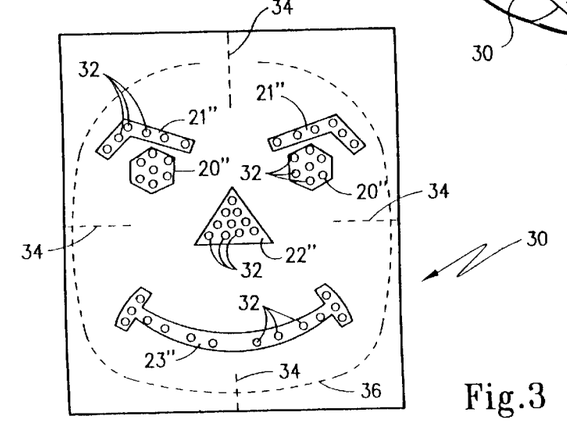
FIG. 3 is a front view in elevation of a representative decorative pattern for use on a pumpkin according to the kit and method of the present invention.
Figure 4:
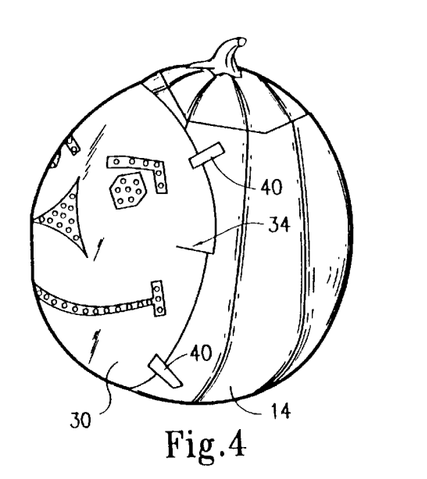
FIG. 4 is a perspective view of a pumpkin having affixed thereto the pattern of FIG. 3.

With reference first to FIG. 1, a pumpkin decorating kit according to the preferred embodiment of the present invention is shown. Here, kit 10 is formed by a package 12 that contains, mounts or otherwise displays for sale the components thereof. Pumpkin decorating kit 10 includes a light source 25, a bag 50 of light pegs, preferably of at least three different colors, and a driving tool such as a mallet 100, all as more thoroughly described below. In addition, pumpkin-decorating kit 10 preferably contains one or more patterns, such as pattern 30 (FIGS. 3 and 4). It should be understood that a light source or illuminative device 25 is of any convenient construction, but is preferably a battery operated light that may have a flashing bulb as described in U.S. Pat. application Ser. No. 09/163,744 filed Sep. 30, 1998, which accomplishes the purposes described below. A base 26 is adapted to mount the light source to the bottom of the pumpkin.

Figure 2:
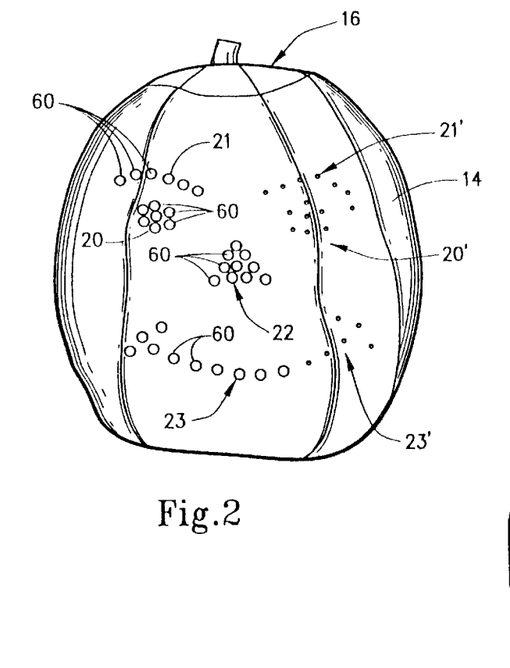
FIG. 2 is a front view in elevation showing a partially decorated pumpkin according to the kit and method of the present invention.

With reference to FIG. 2, it may be seen that representative pumpkin 14 has an access port or lid 16 formed therein to provide an access opening to the interior region or cavity of the pumpkin. To facilitate decorating, the interior of the pumpkin is cleaned to remove the internal matter normally being seeds and fibrous contents thereof to form an open interior cavity, for example, by means of a scraper/scoop such as that described in U.S. Pat. No. 5,092,050 issued Mar. 3, 1992 to Bardeen. In FIG. 2, it may be seen that pumpkin 14 is partially decorated with holiday theme (Halloween) features such as eye 20, eyebrow 21, nose 22 and mouth 23. In addition, as is shown FIG. 2, pumpkin 14 includes a transfer guide for an eye 20', a transfer pattern 21' for an eyebrow and the remainder of the transfer pattern for the mouth 23'. Each of transfer patterns 20', 21' and 23' are formed by dots that are transferred from a pattern sheet to the pumpkin 14 as described below. Moreover, it should be appreciated that each of facial features 20–23 are formed by a plurality of light pegs 60 that are inserted through the exterior surface of the shell wall and through the shell wall of the pumpkin 14 at the locations of the dots forming the eye facial features transferred from the pattern.

A representative pattern sheet 30 according to the present invention is shown in FIG. 3. Pattern sheet 30 generally includes various enlarged design element templates for transferring a pattern to the surface of pumpkin 14. Here, eye templates 20", eyebrow templates 21", nose template 22" and mouth template 23" are shown, arranged in a representative face pattern. Each template includes a plurality of pattern holes 32, which may be pre-cut or scored, or which may be printed on pattern sheet 30 in a medium such as indelible ink. Here, pattern sheet 30 displays a design of pattern holes 32, which is identical to the pattern, formed on pumpkin 14 in FIG. 2. Additionally, pattern sheet 30 includes a plurality of cut lines 34 provided at each edge as well as circumference cut line 36. Pattern sheet 30 may be cut around circumference cut line 36 to provide a generally circular pattern, and severed a portion of the distance of each edge towards the center of pattern sheet 30 which allows pattern sheet 30 to be placed around the generally spherical contour of the pumpkin to be decorated.

Figure 5:
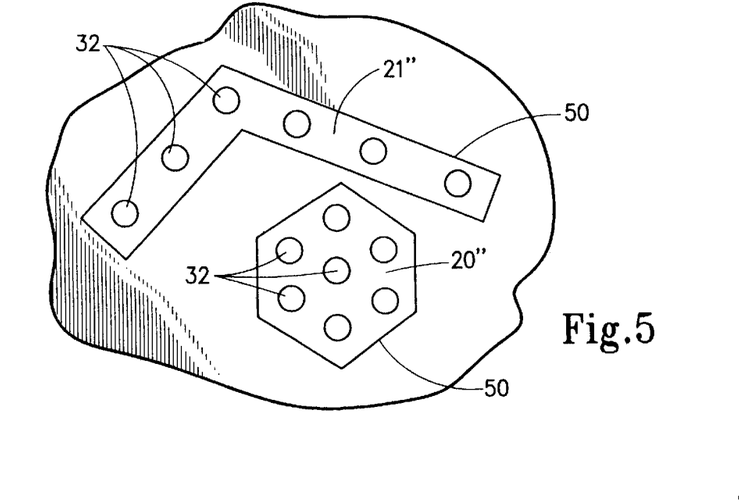
FIG. 5 is an enlarged view of a portion of the pattern shown in FIG. 3.

As shown in FIG. 4, pattern sheet 30 is attached to the surface of pumpkin 14, such as by adhesive tape 40. Pattern sheet 30 may overlap itself near severed cut lines 34, thereby to contour to pumpkin 14. The pattern may be transferred to the surface of pumpkin 14 by using a crayon, marker, pen or other suitable device to mark over the area of outlined bands 50, as shown in FIG. 5, that flank the open pattern holes 32 of the enlarged features of pattern sheet 30. This transfers the pattern of pattern sheet 30 as a series of colored dots on the surface of pumpkin 14, such as the transfer shown in FIG. 2. Optionally, the crayon, marker, pen or other instrument may be used to wholly or partially color in the interior of pattern holes 32 without drawing on pattern sheet 30. Pattern sheet 30 may also have marking that is correlated to light peg 60 colors.

Alternatively, a device such as a push pin or one of light pegs 60 may be used to transfer the pattern of pattern sheet 30 to pumpkin 14 by pushing the device into the surface of pumpkin 14 through pattern sheet 30 and subsequently removing the device thereby to leave a hole in the surface of pumpkin 14 corresponding to each of pattern holes 32. Such method is especially preferred when pattern holes 32 of pattern sheet 30 are simply drawn or imprinted on, rather than cut into, pattern sheet 30. After the pattern has been transferred, the pattern sheet 30 is removed from pumpkin 14 and the shell of pumpkin 14 is ready for the insertion of light pegs 60 to form facial features 20–23, as shown in FIG. 2. Additionally, it should be appreciated that, in lieu of transferring a pattern to pumpkin 14 by the methods discussed above, light pegs 60 may be inserted, by the methods described below, directly through pattern holes 32 and into pumpkin 14. In such case, the pattern sheet 30 would then be removed from the pumpkin surface, thereby leaving the light pegs 60 in the desired pattern on the pumpkin surface.

A representative light peg is shown in FIGS. 6–9. Here, light peg 60 includes an enlarged light emitting head 62 that has a curved shoulder portion 64 proximate thereto. A first end distal light-collecting tip 66 is at the opposite end of shaft 68. Light peg 60 is formed of any suitable material but is preferably a light transmissive material such as a transparent plastic that may be clear or tinted a desired color. Light collecting tip 66 is configured to collect light from the interior of a hollowed out pumpkin 14 from the light source 25 and to conduct or transmit light collected by tip 66 along shaft 68 to a second end emitting head 62 to disperse the light. Accordingly, it is desired that shaft 68 achieve as much internal reflection as possible in a manner to that known in the fiber optic art.

Figure 7:
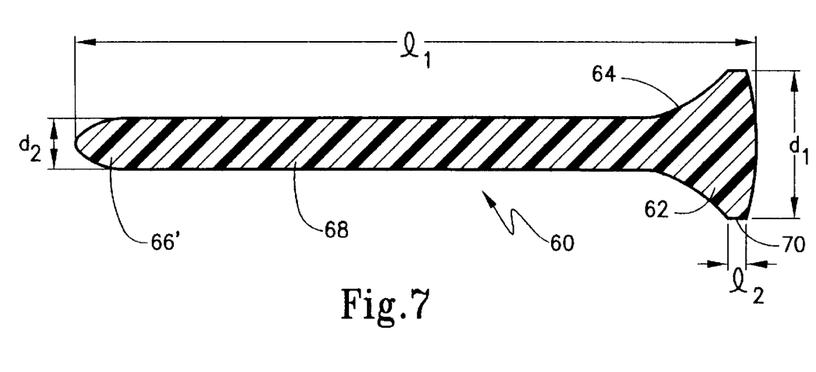
FIG. 7 is a side view in cross-section of the light peg of FIG. 6.

In any event, as is shown in FIG. 7, light peg 60 has a length of at least being equal to the shell wall thickness, with a length "$l_1$" that is preferably about 1.75 inches (44.55 mm). Head 62 has a diameter "$d_1$" that is preferably 0.38 inches (9.53 mm). Head 62 includes a flat cylindrical rim portion 70 that preferably has a length of "$l_2$" in the direction of longitudinal central axis "L" with "$l_2$" being approximately 0.03 inches (0.79 mm). Shoulder 64 tapers from rim 70 in a smooth manner to extend into shaft 68. Shaft 68 is preferably cylindrical and has a diameter "$d_2$" that is approximately 0.13 inches (3.30 mm).

Figures 6, 8, 9:
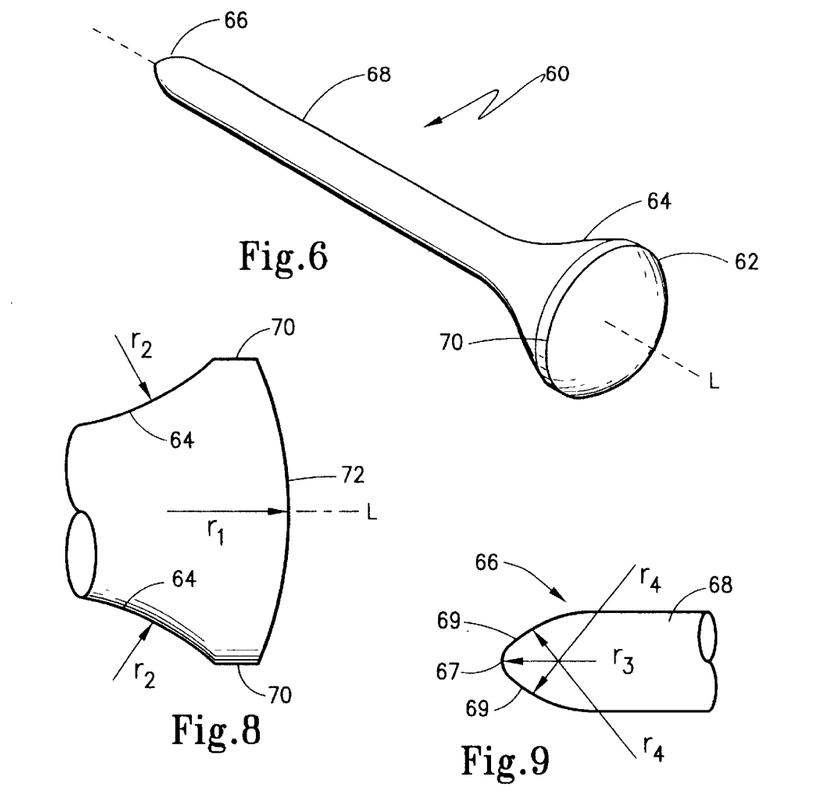
FIG. 6 is a perspective view of a light peg used to decorate a pumpkin according to the kit and method of the present invention.
FIG. 8 is an enlarged view of the head portion of the light peg of FIG. 6.
FIG. 9 is a side view in elevation of the distal light collecting tip portion of the light peg of FIGS. 6 and 7.

With reference to FIG. 8, it may be seen that head 62 has a lensing surface 72 that is arcuately configured at a radius "$r_1$" having a center point on axis "L", with "$r_1$" being sized to provide a general curve to lensing surface 72 that is operative to transmit light in a divergent pattern. As is seen in FIG. 8, lensing surface 72 extends transversely of axis "L" and is designed to emit light that is collected by collecting tip 66 and transmitted through shaft 68 to head 62. Shoulder 64 is also formed at a radius, with this radius "$r_2$" being about 0.4 inches (10.31 mm).

First light collecting end or distal tip 66 is best shown in FIG. 9 having a convergent end portion that is operative to pierce the exterior surface of the shell wall and through the shell wall. The convergent end is formed at two different radii of curvature. The extreme distal tip 67 is formed at a radius of curvature "$r_3$" that is preferably about 0.01 inch (0.30 mm). The portions 69 of distal tip 66 which extend from cylindrical shaft 68 to distal point 67 are formed at a radius of curvature "$r_4$" that is preferably about 0.1 inch (2.54 mm). It should be understood that nay suitable converging tip that facilitates insertion of the light pegs may be suitable but it is preferable that the tip not be excessively sharp to reduce any danger to a young child.

Figures 10, 11, 12:
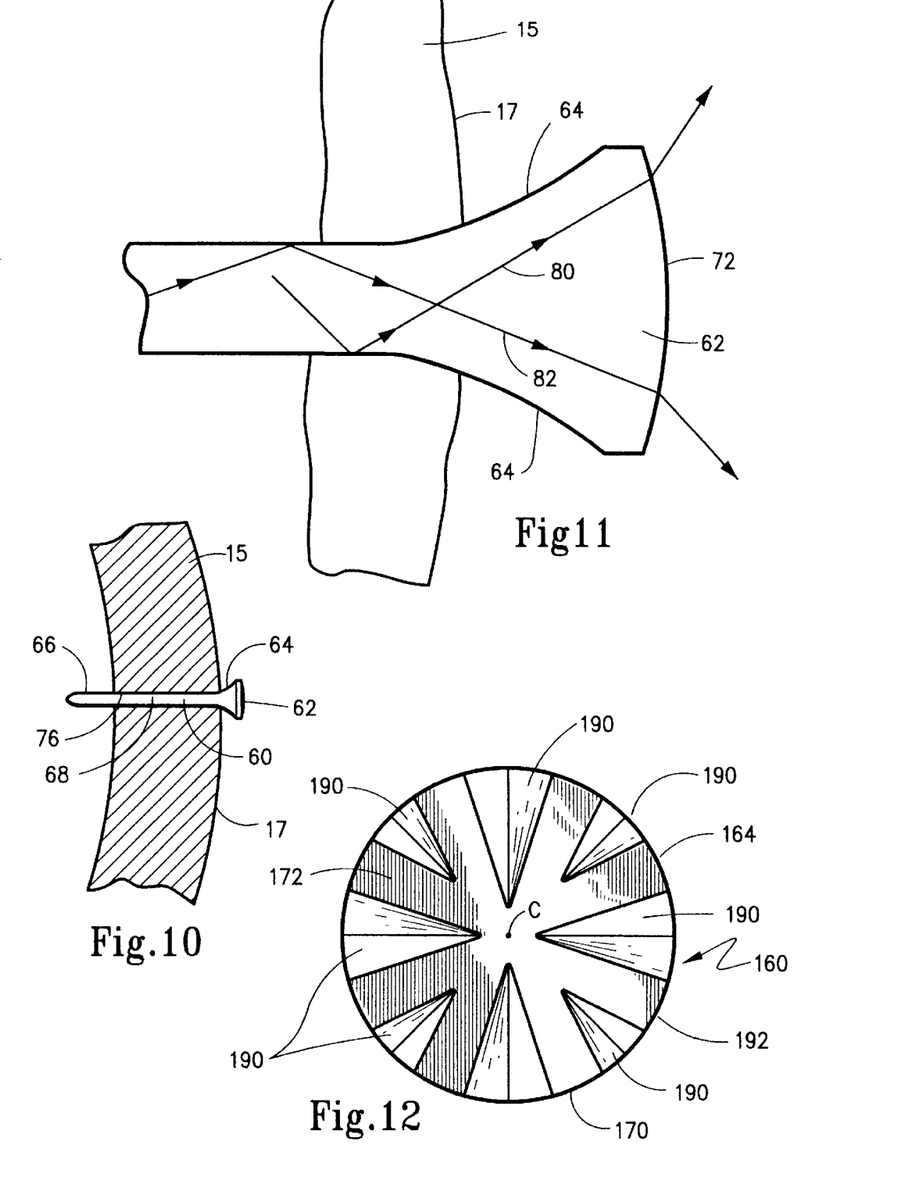
FIG. 10 is a cross-sectional view of a portion of a pumpkin shell having inserted therethrough a light peg according to the present invention.
FIG. 11 is an enlarged view, similar to FIG. 10, but broken away as showing multiple light paths for light rays passing through the light peg of the present invention.
FIG. 12 is a top plan view of an alternative embodiment of the tensing surface of the light peg of the present invention.

With reference now to FIG. 10, it may be seen that a representative light peg 60 is constructed to pierce the exterior surface of the shell wall 17 and through the shell wall 15 of the pumpkin. To this end, the method of the present invention contemplates that an access port or lid 16 is cut in pumpkin 14 after which the internal matter normally being seeds and fleshy pulp are removed from the interior cavity of the pumpkin 14, to form an open interior cavity as described above in reference to FIG. 2. Shell 15 is then thinned from the open interior cavity by scraping until it reaches a selected thickness, preferably approximately one to one-half inches (25.4 mm to 12.7 mm). The pattern to be created on the pumpkin is either then transferred using pattern sheet 30, as described above in reference to FIGS. 3–5. Typically, a single design feature will be formed by a plurality of light pegs 60. Light pegs 60 are then inserted or driven through the exterior surface of the shell wall 17 and through the shell wall 15, as is shown in FIG. 10, in a manner not unlike a nail. Alternatively, as discussed above, light pegs 60 may be driven through shell 15 directly through pattern sheet 30 without first transferring the pattern to pumpkin 14. Shoulder 64 of head 62 acts as a stop as shaft 68 creates a bore 76 in shell 15 so that the shoulder and head portion of light peg 60 protrudes from the exterior surface 17 of pumpkin 14. It should be understood that shell 15 must be thinned sufficiently so that distal collector tip 66 protrudes or communicates into the interior region of the pumpkin so that light from an illumination source placed therein may be collected by tip 66 and transmitted by shaft 68 to emitting head 62. The light transmission of multiple paths is shown in FIG. 11. Here, it should be appreciated that lensing surface 72 along with shoulder 64 act to disperse light on the exterior surface of the shell wall 17 to cause a glowing of each head 62 that is highly visible when a suitable light source is placed in the open interior cavity of the pumpkin for illumination. These multiple light paths are represented by arrowed lines 80 and 82. The light peg 60 ultimately is operative to transmit light from the interior to the exterior of the shell wall 15 so as to be visible by an external observer.

Figure 15:
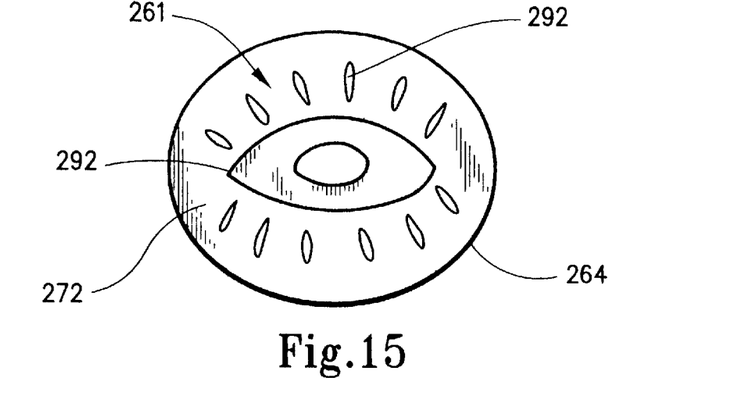
FIG. 15 is a top plan view of an alternative embodiment of the lensing surface of the light peg of the present invention.
Figure 16:
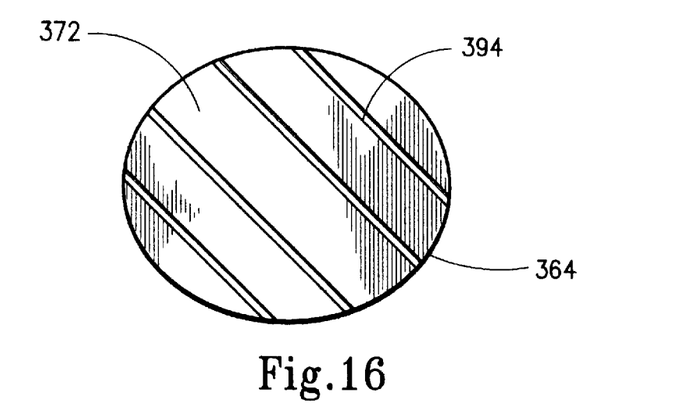
FIG. 16 is a top plan view of an alternative embodiment of the lensing surface of the light peg of the present invention.

To enhance the illumination and to give a sparkly effect to the illuminated design: facets, images, or grooves may be added to the head of the light peg. FIGS. 12, 15, and 16 show alternative heads 164, 264 and 364 with different light emitting head. In FIG. 12, light emitting head 160 has a plurality of facets 190 that are cut equiangularly therearound and extend radially from a center "C" of head 164 to the outer perimeter 192 that is defined by a cylindrical rim 170. In FIG. 15, head 260 and image 261 (an eye) is formed by ribs 292 located on surface 272. In FIG. 16, diagonal channels 394 are formed in surface 372 of head 364. The invention is not, however, limited to thee configurations, as the skilled artisan could design other configurations to produce various aesthetic effects.

It should be understood that the light pegs 160 are preferably integral pieces of molded transparent plastic material such as various resins (including generic acrylic polymers), plastics, polymers, etc. Alternative combinations of facets, images, ribs or grooves may be molded as part of the light pegs or may be formed by cutting or the enlarged head. It is preferred, however, that they be molded into lensing surface 172 as part of the formation operation. Alternatively, the lensing surface 172 may be formed with a pattern.

Figure 18:
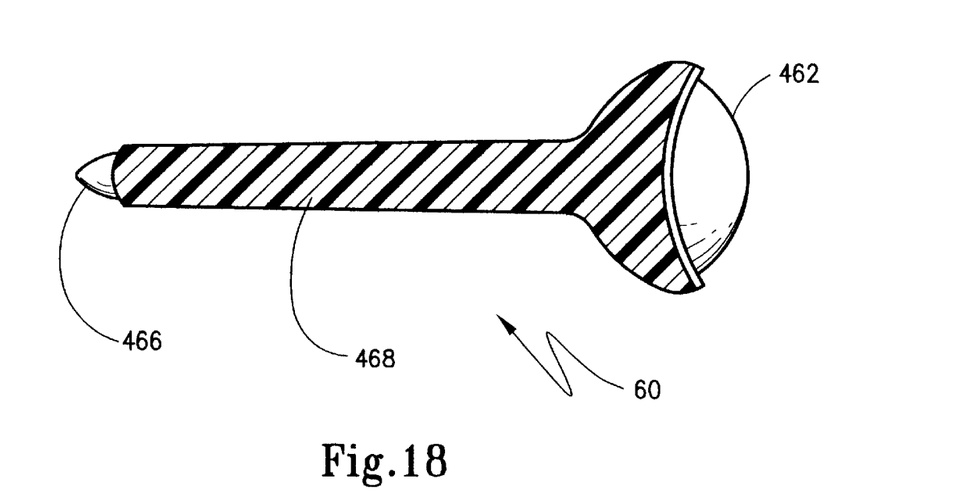
Figure 19:
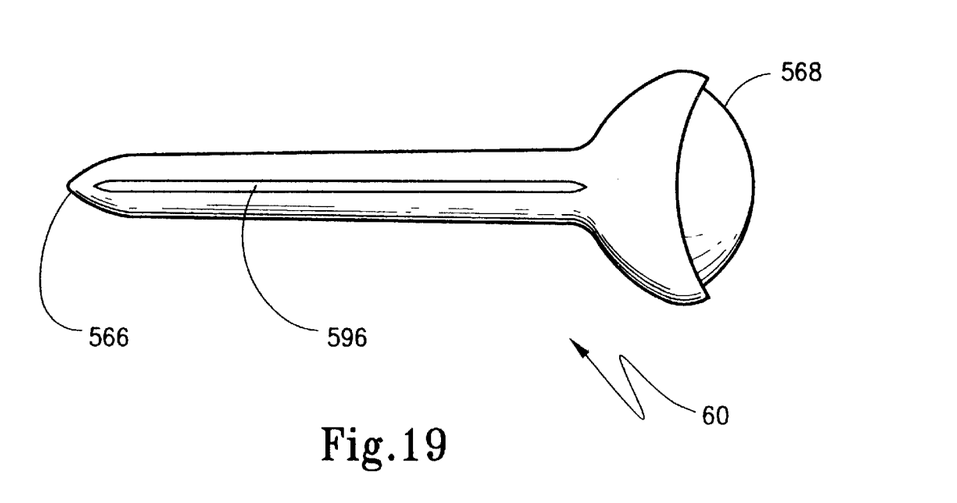

Additionally, various methods of increasing the transmission of light along light peg 60 are contemplated. For example, as is shown in FIG. 18, light peg 460 has a coating 463 formed of shaft 468, with an optically reflective material, thereby to increase the transmission of light from tip 466 to emitting head 462. Note that the coating shall not extend over tip 466 and emitting head 462 to preserve the function of light collection of tip 466 and light emission of head 462. Alternatively, as is shown in FIG. 19, light pegs 560 may be scored with incisions 596, that are adapted to focus light collected from tip 566 toward emitting head 568. Other methods known in the fiber optics industry may additionally be used.

Figures 13, 14:
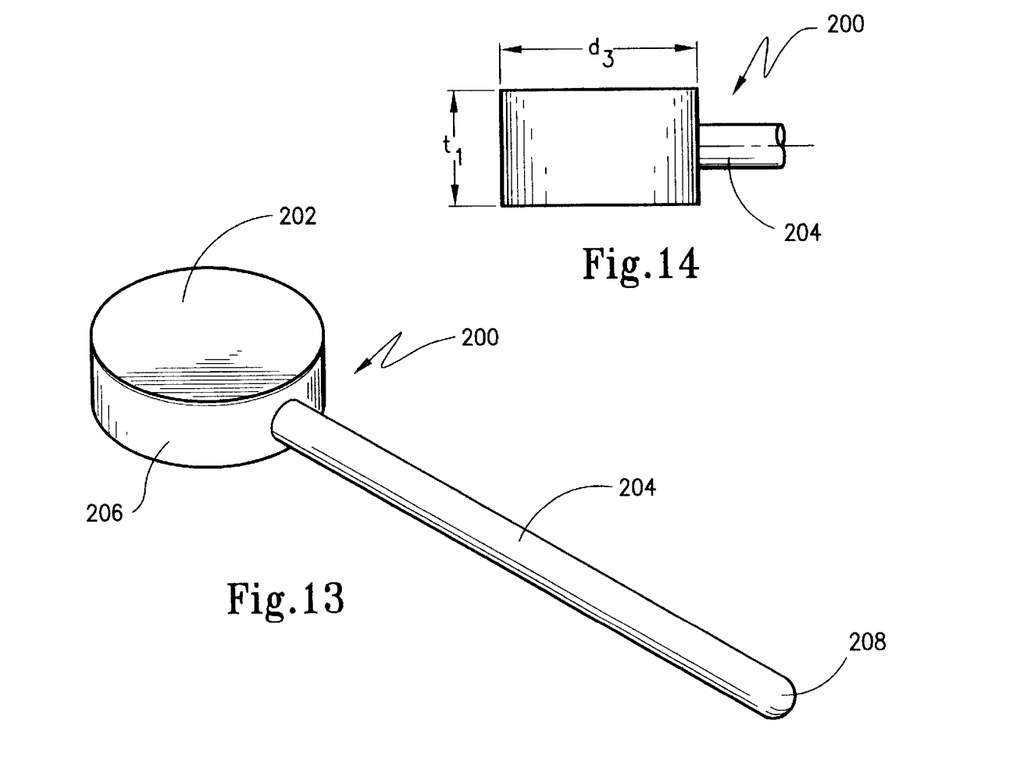
FIG. 13 is a perspective view of an alternative mallet for use in the kit according to the present invention.
FIG. 14 is a side view in elevation of the head portion of the mallet of FIG. 13.
Figure 17:
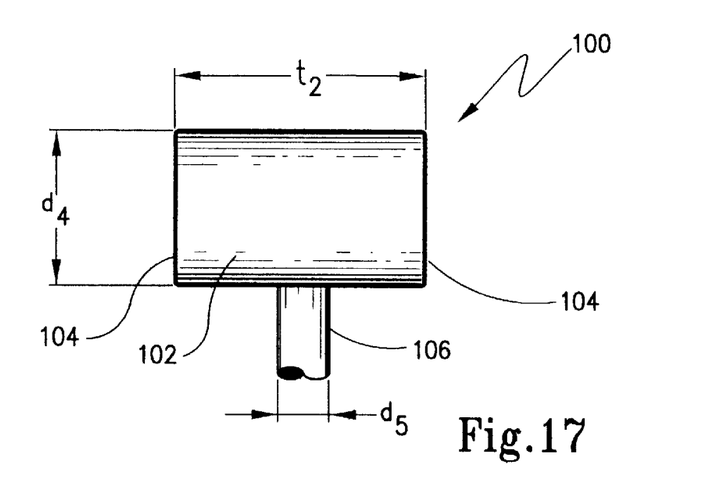
FIG. 17 is a side view in elevation of the head portion of the mallet of FIG. 1.

As noted above, it is desired that the user, such as a young child less than six (6) years of age, be able to pound or drive light pegs, such as light peg 60 through'shell 15 of pumpkin 14. To accomplish this, the kit according to the present invention includes a wooden or plastic mallet 100 as is shown in FIGS. 1 and 17. In FIG. 17, mallet 100 has an enlarged cylindrical head 102 having a diameter "$d_4$" of about 1.38 inches (35.1 mm), and an axial length "$t_2$" of about 1.5 inches (38.1 mm) between the opposite flat ends 104. A handle 106 having a diameter "$d_5$" of about 0.5 inches (12.7 mm) projects radially from the head 102. The handle 106 extends about 5.0 inches (127 mm) from the cylindrical head 102 and is positioned centrally thereof between the opposite flat ends 104, with the handle terminating in a free end 108 as shown in FIG. 1. An alternative mallet is shown in FIGS. 13 and 14. Here, mallet 200 has a cylindrical head 202 that preferably has a diameter "$d_3$" that is 1.5 inches (38.1 mm) and a thickness "$t_1$" that is preferably 1.5 inches (38.1 mm) but may be 1 inch (25.4 mm). A handle 204 extends radially outwardly from cylindrical surface 206 to terminate at a free end 208. Handle 204 preferably has a length of approximately 5 inches (127 mm). Naturally, other suitable constructions of mallets 100 and 200 are within the scope of the present invention.

In any event it should be understood that other tools such as blocks, could be used to drive pegs 60 through the shell wall. In any event such tool should be sized and configured for use by a child of age six (6) or less.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

We claim:

1. A kit for illuminative decoration of an exterior surface portion of a shell wall formed from a item of produce to have a selected shell wall thickness and an open interior, comprising:

(a) a plurality of light pegs constructed of a light transmissive material and having a length at least equal to the shell wall thickness, at least some of said light pegs having an enlarged peg head and an elongated shaft extending therefrom, said shaft terminating in a light collecting end;

(b) a pattern sheet adapted to attach to an exterior surface portion of the shell of the shell wall and marked to locate positions for at least some of said light pegs;

(c) a mallet having an enlarged mallet head and a handle that extends radially outwardly from said head, said handle terminating at a free end, said mallet adapted to permit manual driving of said light pegs into the exterior surface of the shell wall; and (d) an illumination device adapted to be placed in the open interior of the item of produce and operative to emit light, said light collecting end of each said light peg operative to collect light from said illumination device, said elongated shaft of each light peg operative to transmit light from said light collecting end to said enlarged peg head, and said enlarged peg head of each light peg operative to disperse transmitted light from the interior to the exterior so as to be visible to an observer.

2. A kit for illuminative decoration according to claim 1 wherein said light collecting end of each of said light pegs has a convergent end portion opposite of said enlarged peg head that is adapted to facilitate penetration of said shaft through the shell wall.

3. A kit for illuminative decoration according to claim 1 wherein said enlarged peg heads are sized and configured to act as a stop against the exterior surface portion of the shell wall when said elongated shafts are driven through the exterior surface portion of the shell wall to allow said enlarged peg heads to protrude from the exterior surface of the shell wall.

4. A kit for illuminative decoration according to claim 1 wherein some of said enlarged peg heads have outer surfaces formed with light reflective structures selected from a group consisting of facets, grooves, and images.

5. A kit for illuminative decoration according to claim 1 wherein some of said elongated shafts are coated with an optically reflective material.

6. A kit for illuminative decoration according to claim 1 wherein some of said elongated shafts have incision grooves located on an outside surface of said shaft.

7. A method for illuminative decoration for an exterior surface of a large item of produce having a shell wall and an interior cavity containing matter, comprising the steps of:
  (a) providing a plurality of light pegs that are constructed of a light transmissive material and that include a light collecting portion, a light-emitting portion and a shaft having a length extending from said light collecting portion to said light emitting portion;
  (b) cutting an access port into the shell wall of the item of produce to expose the interior cavity;
  (c) removing the matter from the interior cavity of the item of produce to form an open interior cavity;
  (d) scraping the shell wall from the open interior cavity of the produce to reduce the thickness of the shell wall to a dimension about equal to or less than the length of said shaft;
  (e) inserting at least some of said light pegs into the exterior surface of the shell wall to a depth of at least the shell wall thickness; and
  (f) illuminating the open interior cavity of the produce.

8. A method for illuminative decoration according to claim 7 wherein the step of inserting a plurality of light pegs into the exterior surface of the shell wall and through the shell wall is accomplished by driving the light pegs through the shell with a tool.

9. A method for illuminative decoration according to claim 7 including the step of providing a pattern on the exterior surface of the item of produce and inserting said pegs according to said pattern thereby to produce the desired decoration on the exterior surface.

10. A method according to claim 7 including the step of employing a plurality of said light pegs to create a common design feature.

11. A method according to claim 7 wherein the step of illuminating the open interior cavity is accomplished by placing an electrically powered light source in the interior cavity.

12. A kit for illuminative decoration of an exterior surface portion of a shell wall formed from an item of produce to have a selected shell wall thickness and an open interior, comprising:
  (a) a plurality of light pegs constructed of a light transmissive material and having a length at least equal to the shell wall thickness wherein each of said light pegs has a first end that operates to collect light, a shaft portion operative to transmit the light to a second end that is opposite the first end, said second end including an enlarged peg head operative to emit transmitted light divergently therefrom; and
  (b) a tool adapted to drive said light pegs through the exterior surface such that a portion thereof optically communicates with the open interior of the item of produce.

* * * * *